UNITED STATES PATENT OFFICE.

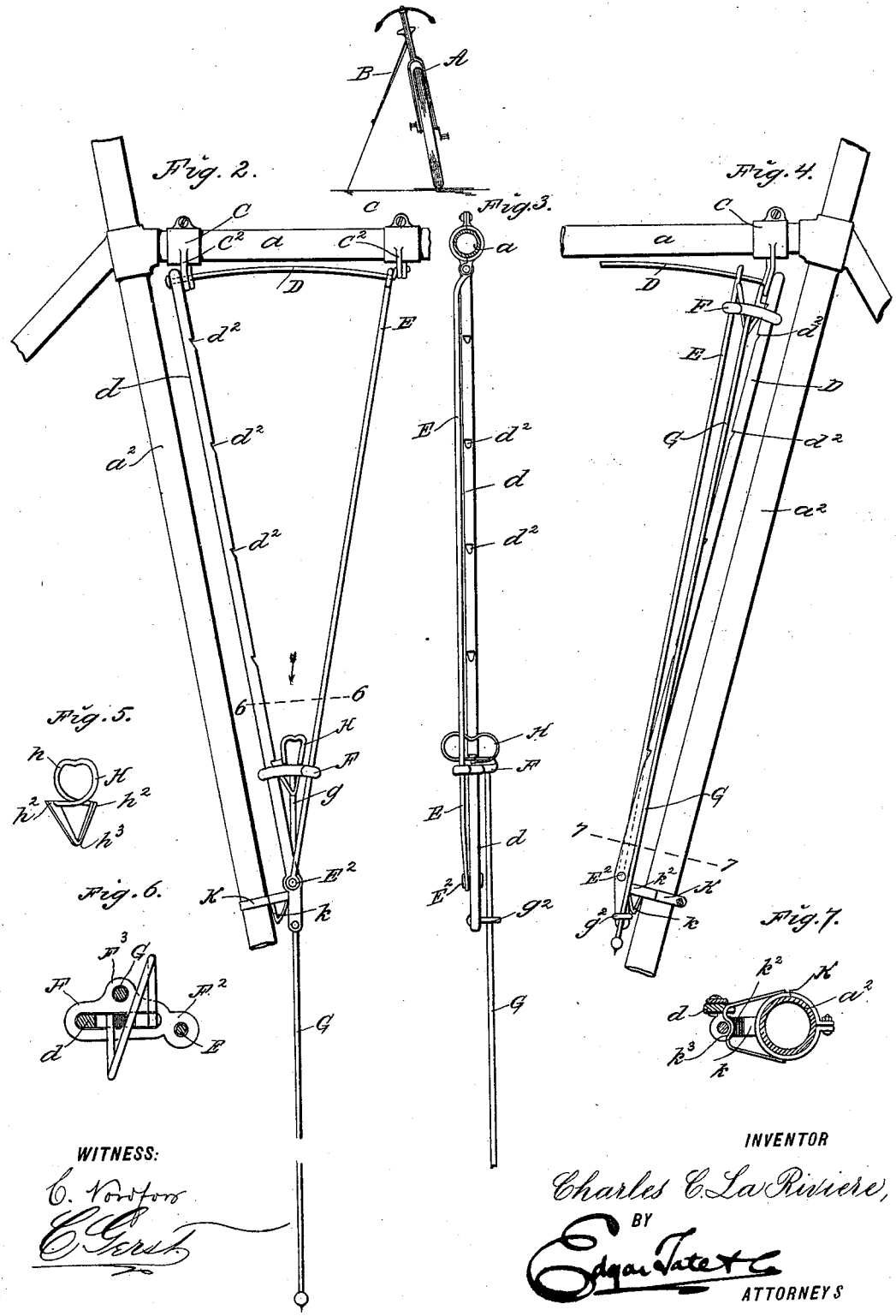

CHARLES CLEMENT LA RIVIERE, OF NEWPORT, RHODE ISLAND.

BICYCLE-SUPPORT.

SPECIFICATION forming part of Letters Patent No. 578,041, dated March 2, 1897.

Application filed April 22, 1896. Serial No. 588,568. (No model.)

*To all whom it may concern:*

Be it known that I, CHARLES CLEMENT LA RIVIERE, a citizen of the United States, and a resident of Newport, in the county of Newport and State of Rhode Island, have invented certain new and useful Improvements in Supports for Bicycles, of which the following is a specification, reference being had to the accompanying drawings, forming a part thereof, in which similar letters of reference indicate corresponding parts.

This invention relates to means for supporting bicycles in an upright position; and the object thereof is to provide an effective device of this class which is simple in construction and operation and which is adapted to be secured to the frame of the bicycle in such manner that it will not interfere with the operation thereof, and so that it may be used whenever desired to support the same in an upright position.

The invention is fully disclosed in the following specification, of which the accompanying drawings form a part, in which—

Figure 1 is an end view of a bicycle provided with my improved support; Fig. 2, a side view of a portion of the frame with the support connected therewith, showing the parts in position for use; Fig. 3, a front view of the construction shown in Fig. 2; Fig. 4, a side view taken in an opposite direction from that of Fig. 2 and showing parts of the supports folded, as when not in use; Fig. 5, a side view of a spring which I employ; Fig. 6, a section on the line 6 6 of Fig. 2, and Fig. 7 a section on the line 7 7 of Fig. 4.

In the drawings forming part of this specification, A represents an ordinary bicycle provided with my improved support B, and in the construction shown in Fig. 2 and 4, $a$ represents the horizontal top bar of the frame, and $a^2$ that portion of the frame which extends from the seat-support downwardly to the support of the pedal-shaft, and in the practice of my invention I provide two bands or sleeves C, which are secured to the horizontal rod or bar $a$ and which are provided on their lower sides with shoulders or projections $C^2$, through which passes a rod D, to the end of which, adjacent to the upright rod $a^2$, is secured a bar $d$, having notches or recesses $d^2$ therein, and mounted on the opposite end of the rod D is another or supplemental rod E, which is pivotally connected with the bar $d$ at the lower end thereof, as shown at $E^2$. I also provide a link F, through which the bar $d$ and the supplemental rod E pass, said link being provided at one end with an extension $F^2$, through which the rod E passes and being provided at one side with a shoulder or projection $F^3$, to which is secured an auxiliary rod G.

The link F is free to slide on the bar $d$ and the rod E, and mounted therein is a lock-spring H, which is composed of wire and the central portion of which is bent to form a loop $h$, the sides thereof being crossed and carried outwardly, as shown at $h^2$, and the ends being brought together to form a V-shaped extension, as shown at $h^3$, and the V-shaped extension thereof is passed through the link F, and said link and said lock-spring are thus secured to said link or connected therewith, while being removable therefrom, and the lower end or V-shaped extension $h^3$ thereof bears upon the upper end of the auxiliary rod G, as shown at $g$, and one of the side extensions $h^2$ is adapted to enter the notches or recesses $d^2$ in the bar $d$.

The auxiliary rod G passes through a loop $g^2$, secured to the lower end of the bar $d$, and secured to the lower end of the upright rod $a^2$ of the frame is a band K, to the front side of which is secured a V-shaped spring $k$, which carries a yoke-shaped spring $k^2$, the ends of which press upon the band K or the sides of the upright rod $a^2$, and the cross-head of said yoke-shaped spring $k^2$ is provided with an inwardly-directed loop $k^3$, in which the auxiliary rod G is adapted to rest when drawn into its highest position, as shown in Fig. 4, and the lower end of the bar $d$ is inwardly curved and also rests upon or comes in contact with one side of the yoke-shaped spring $k^2$, and the object of this arrangement is to hold the lower end of the support in proper position when the auxiliary rod G is drawn upwardly and when the bicycle is in use, and it will be understood that the link F is adapted to be drawn up into the position shown in Fig. 4, and in this operation the auxiliary rod G is drawn upwardly therewith, as shown in said figure, and said link is held in the raised position by means of the lock-spring H, which operates in connection with the notches or recesses $d^2$, and when said link is in the raised position the supplemental rod E is drawn inwardly adjacent to the bar $d^2$.

Whenever it is desired to support the bicycle in an upright position, the auxiliary rod G, together with the link F, is drawn downwardly, as shown in Fig. 2, and the lower end thereof is swung out, as shown in Fig. 1, and thus supports the bicycle in an upright or partially upright position, and whenever it is desired to use the machine it is only necessary to raise the link F into the position shown in Fig. 4.

This device is simple in construction and operation and perfectly adapted to accomplish the result for which it is intended, and it is evident that changes in and modifications of the construction herein described may be made without departing from the spirit of my invention or sacrificing its advantages, and I reserve the right to make all such alterations therein and modifications thereof as fairly come within the scope of the invention.

Having fully described my invention, I claim as new and desire to secure by Letters Patent—

1. The combination with the frame of a bicycle, of a support which is pivotally connected with the upper horizontal rod of the frame, said support consisting of a rod which is connected with said rod of the frame, and parallel therewith, to one end of which is secured a bar which extends parallel with one of the upright rods of the frame, and on the opposite end of which is mounted a rod which is free to slide thereon, the lower end of said rod being pivotally connected with said bar adjacent to the lower end thereof, and a link mounted on said bar, and said rod and free to slide thereon, and provided with an auxiliary rod which extends downwardly through a ring or loop connected with the lower end of said bar and means for holding the auxiliary rod in position, substantially as shown and described.

2. The combination with the frame of a bicycle, of a support which is pivotally connected with the upper horizontal rod of the frame, said support consisting of a rod which is connected with said rod of the frame, and parallel therewith, to one end of which is secured a bar which extends parallel with one of the upright rods of the frame, and on the opposite end of which is mounted a rod which is free to slide thereon, the lower end of said rod being pivotally connected with said bar adjacent to the lower end thereof, and a link mounted on said bar, and said rod and free to slide thereon, and provided with an auxiliary rod which extends downwardly through a ring or loop connected with the lower end of said bar, said bar being provided with notches or recesses, and means connected with said link and operating in connection with said notches or recesses to hold the same in a raised or lowered position, substantially as shown and described.

3. The combination with the frame of a bicycle, of a support which is pivotally connected with the upper horizontal rod of the frame, said support consisting of a rod which is connected with said rod of the frame, and parallel therewith, to one end of which is secured a bar which extends parallel with one of the upright rods of the frame, and on the opposite end of which is mounted a rod which is free to slide thereon, the lower end of said rod being pivotally connected with said bar adjacent to the lower end thereof, and a link mounted on said bar, and said rod and free to slide thereon, and provided with an auxiliary rod which extends downwardly through a ring or loop connected with the lower end of said bar, said bar being provided with notches or recesses, and means connected with said link and operating in connection with said notches or recesses, to hold the same in a raised or lowered position, consisting of a spring-lock which is detachably connected with said link and which is provided with a projection which operates in connection with said notches or recesses, substantially as shown and described.

4. The combination with the frame of a bicycle, of a support which is pivotally connected with the upper horizontal rod of the frame, said support consisting of a rod which is connected with said rod of the frame, and parallel therewith, to one end of which is secured a bar which extends parallel with one of the upright rods of the frame, and on the opposite end of which is mounted a rod which is free to slide thereon, the lower end of said rod being pivotally connected with said bar adjacent to the lower end thereof, and a link mounted on said bar, and said rod, and free to slide thereon, and provided with an auxiliary rod which extends downwardly through a ring or loop connected with the lower end of said bar, said bar being provided with notches or recesses and means connected with said link and operating in connection with said notches or recesses to hold the same in a raised or lowered position, consisting of a spring-lock which is detachably connected with said link and which is provided with a projection which operates in connection with said notches or recesses, and a spring-yoke connected with the lower end of the upright rod of the frame, which is adapted to hold the lower end of the support, when the bicycle is in use, substantially as shown and described.

In testimony that I claim the foregoing as my invention I have signed my name, in presence of the subscribing witnesses, this 17th day of April, 1896.

CHARLES CLEMENT LA RIVIERE.

Witnesses:
JOSEPH KELLER,
JOHN J. PICKETT.